(12) United States Patent
Van Denend et al.

(10) Patent No.: US 7,750,267 B2
(45) Date of Patent: Jul. 6, 2010

(54) APPARATUS AND METHOD FOR LASER ENGRAVEABLE PRINTING PLATES

(76) Inventors: Mark E. Van Denend, 349 E. 36th St., Paterson, NJ (US) 07504; Arthur Van Der Weijden, Kinderdijkstraat 27, Tilburg (NL) 5045 pa (*) Notice: Subject to any disclaimer, the term of this patent is extended or adjusted under 35 U.S.C. 154(b) by 491 days.

(21) Appl. No.: 11/411,062

(22) Filed: Apr. 25, 2006

(65) Prior Publication Data
US 2007/0248907 A1 Oct. 25, 2007

(51) Int. Cl.
B23K 26/00 (2006.01)
(52) U.S. Cl. .............. 219/121.6; 219/121.69; 219/121.68
(58) Field of Classification Search .......... 219/121.6, 219/121.67, 121.69, 121.68, 121.72
See application file for complete search history.

(56) References Cited

U.S. PATENT DOCUMENTS

| | | | |
|---|---|---|---|
| 4,087,672 A | 5/1978 | Yi | |
| 4,925,523 A * | 5/1990 | Braren et al. | 216/66 |
| 5,293,426 A | 3/1994 | Wouch et al. | |
| 5,422,958 A | 6/1995 | Wouch et al. | |
| 5,671,063 A | 9/1997 | Auberry et al. | |
| 5,804,353 A | 9/1998 | Cushner et al. | |
| 5,831,746 A | 11/1998 | Seitz et al. | |
| 6,159,659 A | 12/2000 | Gelbart | |
| 6,178,852 B1 | 1/2001 | Pfaff | |
| 6,331,177 B1 * | 12/2001 | Munnerlyn et al. | 606/5 |
| 6,551,759 B2 | 4/2003 | Daems et al. | |
| 6,551,762 B1 | 4/2003 | Gaignou et al. | |
| 6,627,385 B2 | 9/2003 | Hiller et al. | |
| 6,737,216 B2 | 5/2004 | Kannurpatti et al. | |
| 6,776,095 B2 | 8/2004 | Telser et al. | |
| 6,794,115 B2 | 9/2004 | Telser et al. | |
| 6,797,455 B2 | 9/2004 | Hiller et al. | |
| 2003/0227614 A1 | 12/2003 | Taminiau et al. | |
| 2004/0118180 A1 | 6/2004 | Keating | |
| 2005/0138988 A1 | 6/2005 | Levasier et al. | |

* cited by examiner

Primary Examiner—M. Alexandra Elve
(74) Attorney, Agent, or Firm—Richard M. Goldberg

(57) ABSTRACT

An apparatus and method for calibration of laser ablating energy versus ablating depth for a laser ablateable printing plate in relation to materials forming the printing plate, includes a memory for storing data, for each of a plurality of materials, corresponding to correlated different detected depths of each of a plurality of laser ablated areas with ablating energy levels. A first laser ablates a printing image of desired depth in a printing plate formed by a selected one of the materials. A first control device interpolates laser ablating energy levels for the printing image of desired depth in the printing plate formed by the selected material, in accordance with the stored data and the selected material, and controls the laser to laser ablate the printing image in the printing plate of the selected material in accordance with the interpolated laser ablating energy levels.

6 Claims, 5 Drawing Sheets

APPARATUS AND METHOD FOR LASER ENGRAVEABLE PRINTING PLATES

BACKGROUND OF THE INVENTION

The present invention relates generally to printing plates, and more particularly, is directed to an apparatus and method for the calibration of laser ablateable printing plates.

Printing plates can be made of different materials. For example, in a flexographic printing machine, a laser ablateable printing plate can be used as the printing medium. In such case, the laser ablateable printing plate can be produced from a variety of polymeric and elastomeric materials.

An image can therefore be formed on the printing plate using a process of laser ablating. In such case, a laser cuts away or ablates material from the printing plate, and the remaining non-ablated or raised portions represent the image to be used on the printing plate in a printing operation. In this manner, the laser ablates excess material from the surface of the plate, leaving only those areas which are needed for printing. In order to control this laser ablating operation, the images to be ablated on the printing areas are digitally input to the laser.

However, variations exist in the ablatability of different plate materials, whereby one plate material will ablate differently from another plate material, even when the image from the laser is the same, and the laser performance remains consistent. Further, the speed of laser ablating is directly proportional to the available energy of the laser and the relief depth of ablating. In order to maximize laser ablating speed, it is desirable to set the laser energy to the correct level needed to ablate a particular relief depth.

Therefore, it is necessary to know how deep to laser ablate the material in the printing plate. For example, 80% laser energy will cut deeper for one material than another material. Therefore, it is necessary to provide a calibration for the particular materials in order to set the laser energy, that is, the laser power and speed/duration of laser power, during a laser ablating operation. For example, the longer that the laser is applied at a given power, the more energy that is supplied for ablating. Therefore, both laser power and speed of the laser (which corresponds to the duration of laser power) will change the amount of laser energy that is applied.

In order to accomplish this, it is necessary to make adjustments to the laser parameters for laser ablating different plate materials in order to obtain a consistent ablated image. This process is generally known as material calibration. Specifically, it is known in the prior art to provide a number of laser ablations on a plate of a known material, and then, the depth of each ablated or engraved area is manually measured. Thus, the existing method for calibration of a laser ablateable plate material includes the steps of ablating the material using a range of laser energies, from 0% laser energy to 100% laser energy, and then manually measuring the depth of the ablations. The laser energy is then adjusted to suit the target relief depth.

A number of variables can affect the performance and accuracy of the calibration, including, but not limited to:

a) the resolution of the digital image being ablated;

b) the ablatability of the plate material;

c) the number of steps of laser energy being used for ablating (i.e. from 0% to 100%);

d) small variations in laser energy during the calibration process; and e) operator errors in manual measurement of ablated depths.

As a result, this is a cumbersome and burdensome process, and requires a relatively long period of time. Although it is generally accepted that a higher number of steps of laser energy that are used during the calibration process leads to a more accurate calibration, each step of laser energy requires a manual measurement, which prolongs the length of the calibration process, and increases the risk of inaccuracies in manual measurements.

For this reason, known material calibration can be a long process, taking several hours, and requiring careful manual measurements, in order to achieve reliable results.

SUMMARY OF THE INVENTION

Accordingly, it is an object of the present invention to provide an apparatus and method for the calibration of laser ablateable printing plates that overcomes the aforementioned problems.

It is another object of the present invention to provide an apparatus and method for the calibration of laser ablateable printing plates with improved speed and reliability compared to conventional plate material calibration.

It is still another object of the present invention to provide an apparatus and method for the calibration of laser ablateable printing plates, which can reduce or totally eliminate any manual measurements during the calibration process, by using previously determined laser scanning versus depth measurements.

It is yet another object of the present invention to provide an apparatus and method for the calibration of laser ablateable printing plates that correlates optimum laser energy in relation to ablated depth.

It is a further object of the present invention to provide an apparatus and method for the calibration of laser ablateable printing plates that establishes an optimum laser energy level for optimum ablating speed for any plate material.

It is a still further object of the present invention to provide an apparatus and method for the calibration of laser ablateable printing plates that reduces the time taken to carry out plate material calibrations to minutes rather than hours.

It is a yet further object of the present invention to provide an apparatus and method for the calibration of laser ablateable printing plates that uses a laser which ablates a number of areas or bands in a material at different energy levels, followed by a second scanning laser which measures the depth of the ablated areas, whereupon a graph can be charted in order to interpolate any inbetween depths.

It is another object of the present invention to provide an apparatus and method for the calibration of laser ablateable printing plates that is relatively inexpensive and easy to use and manufacture.

In accordance with an aspect of the present invention, apparatus for calibration of laser ablating energy versus ablating depth in a material, includes a memory for storing correlated data of detected depths of laser ablated areas of a first sample of a selected material and correlated laser energy levels for each area. A first ablating laser is provided for ablating a desired depth in a different sample of the selected material. A first control device is provided for interpolating laser ablating energy levels for the desired depth in the different sample of the material in accordance with the stored data, and controlling the laser to laser ablate the selected material in accordance with the interpolated laser ablating energy levels.

The apparatus further includes a second ablating laser for ablating different depths in the first sample with different laser energy levels for each depth. A detector detects each depth, the detector including a scanning laser which scans each depth. A second control device correlates the detected depths with the energy levels used to ablate each area to produce the correlated data, and stores the correlated data in the memory.

Preferably, the detector includes a device which detects reflection of laser light of the scanning laser from each area.

The first and second ablating lasers can be the same or different, and said first and second control devices can be the same or different.

Preferably, the memory stores correlated data of detected depths of laser ablated areas for each of a plurality of materials and laser energy levels for each area, and the first ablating laser ablates a desired depth in a selected one of the plurality of materials. Then, the first control device interpolates laser ablating energy levels for the desired depth in the selected one of the plurality of materials in accordance with the stored data corresponding to the selected one of the plurality of materials, and controls the laser to laser ablate the selected material in accordance with the interpolated laser ablating energy levels for that material.

In accordance with another aspect of the present invention, apparatus for calibration of laser ablating energy versus ablating depth in a material, includes an ablating laser for ablating different depths in a selected material with different laser energy levels for each depth. A detector detects each depth, the detector including a scanning laser which scans each depth. A control device correlates the detected depths with the energy levels used to ablate each area to produce correlated data, and stores the correlated data in a memory.

In accordance with still another aspect of the present invention, a method for calibration of laser ablating energy versus ablating depth in a material, includes the steps of storing correlated data of detected depths of laser ablated areas of a first sample of a selected material and correlated laser energy levels for each area in a memory, and ablating a desired depth in a different sample of the selected material with a first laser. Then, the method includes the steps of interpolating laser ablating energy levels for the desired depth in the different sample of the material in accordance with the stored data; and controlling the laser to laser ablate the selected material in accordance with the interpolated laser ablating energy levels.

The method further includes the steps of ablating different depths in the first sample with different laser energy levels for each depth; detecting each depth with a scanning laser which scans each depth; correlating the detected depths with the energy levels used to ablate each area to produce the correlated data; and storing the correlated data in the memory.

Preferably, the step of storing includes the step of storing correlated data of detected depths of laser ablated areas for each of a plurality of materials and laser energy levels for each area. The step of ablating includes the step of ablating a desired depth in a selected one of the plurality of materials. The step of interpolating includes the step of interpolating laser ablating energy levels for the desired depth in the selected one of the plurality of materials in accordance with the stored data corresponding to the selected one of the plurality of materials; and the step of controlling includes the step of controlling the laser to laser ablate the selected material in accordance with the interpolated laser ablating energy levels for that material.

In accordance with yet another aspect of the present invention, a method for calibration of laser ablating energy versus ablating depth in a material, includes the steps of ablating different depths in a selected material with different laser energy levels for each depth; detecting each depth with a scanning laser which scans each depth; correlating the detected depths with the energy levels used to ablate each area to produce correlated data, and storing the correlated data in a memory.

The above and other objects, features and advantages of the invention will become readily apparent from the following detailed description thereof which is to be read in connection with the accompanying drawings.

DETAILED DESCRIPTION

Figure 1:
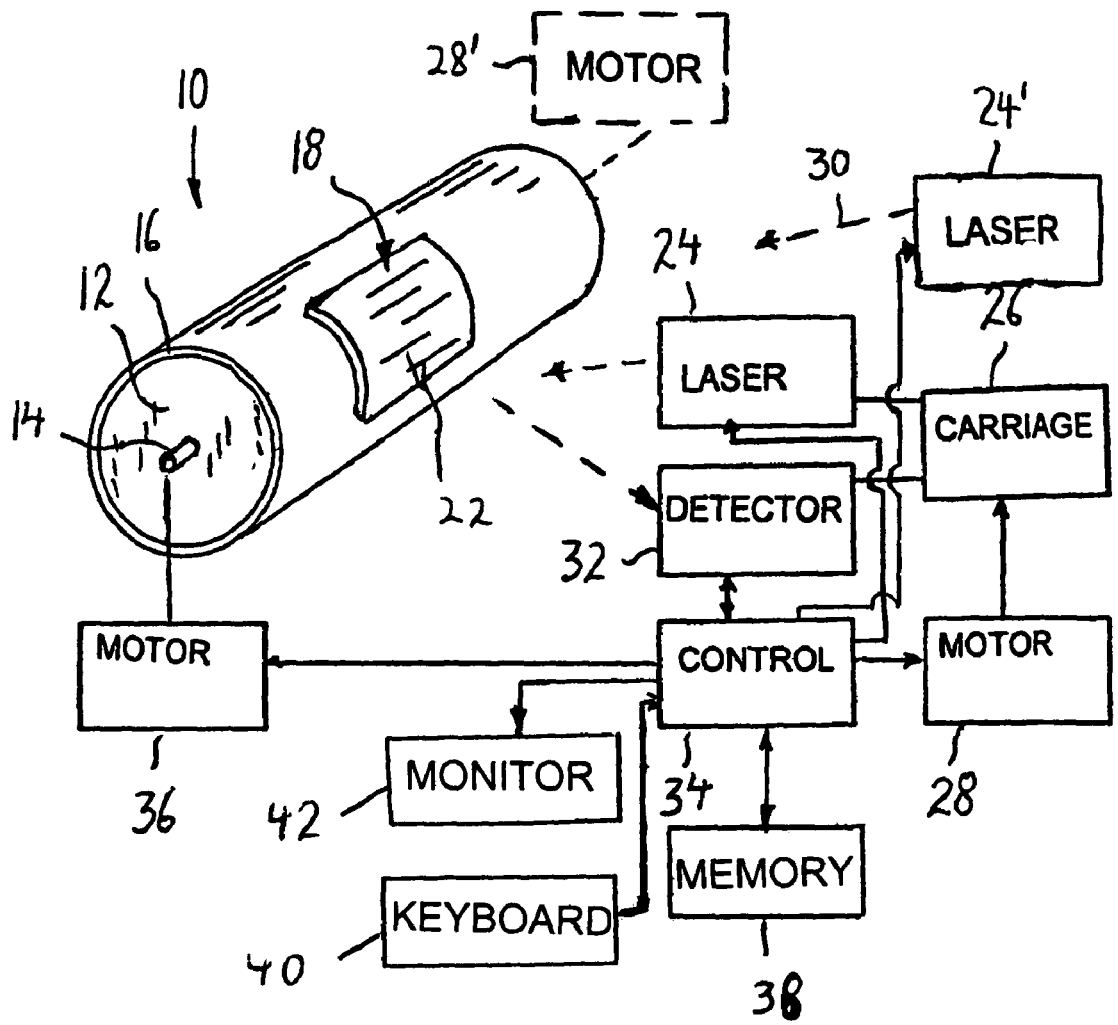
FIG. 1 is perspective view and block diagram of apparatus according to the present invention.
Figure 2:
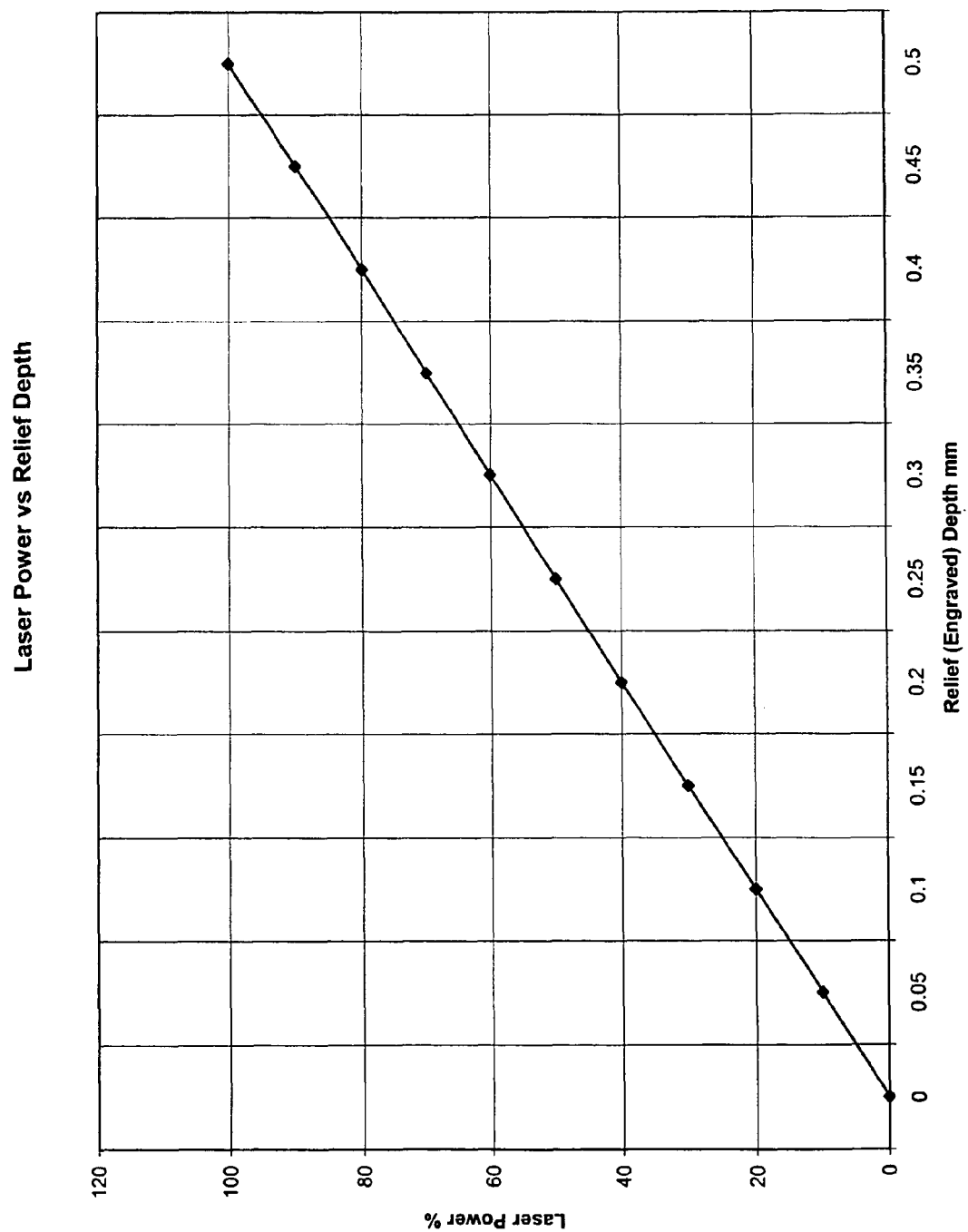
FIG. 2 is graphical diagram of a ten step scan of laser energy versus ablated depth.

Referring to the drawings in detail, and initially to FIGS. 1 and 2 thereof, a printing roller 10 for a printing press, such as a flexographic printing press, includes a cylindrical roller 12 mounted on a shaft 14. Printing roller 12 further includes an annular sleeve 16 mounted on cylindrical roller 12. Preferably, sleeve 16 extends completely around the entire circumference of cylindrical roller 12. A printing plate 18 is mounted on an outer surface of sleeve 16. Alternatively, printing plate 18 can be mounted directly on cylindrical roller 12 without sleeve 16. Printing plate 18 will be ablated in order to produce a printing image during a printing operation, as is well known in the art.

It is also known to laser ablate the mounted printing plate 18 with a laser 24 in order to form the printing image thereon, that is, the printing image is formed as a raised image on the portions of printing plate 18 which are not laser ablated. In this regard, printing plate 18 is preferably made of a non-living material that permits such laser ablating, including but not limited to any flexible substrate made from a photopolymer, vulcanized rubber, a thermal polymer, or any other suitable material, and including but not limited to the materials discussed in U.S. Pat. Nos. 5,804,353; 6,551,759; 6,551,762; 6,159,659; 6,627,385; 6,776,095; 6,794,115; 6,737,216; 6,178,852; and 6,797,455, the entire disclosures of which are incorporated herein by reference.

Specifically, an apparatus for laser ablating printing plate 18 in order to form the printing image thereon includes laser 24, such as a $CO_2$ laser, a YAG laser or any other suitable laser, to ablate the outer surface of printing plate 18. Laser 24 is preferably mounted on a movable carriage 26 that can move along the lengthwise direction of printing roller 10 by means of a drive motor 28. Alternatively, as shown by dashed lines in FIG. 1, a drive motor 28' can be used to move printing roller 10 in the lengthwise direction thereof relative to laser 24 which is stationary. For example, a solenoid operated drive motor 28' can be used for such purpose. It will, however, be appreciated that any other suitable drive can be used for this purpose, for example, a lead screw or the like. Still further, both drive motor 28 and drive motor 28' can be used in conjunction with each other. In other words, it is only important that there be relative lengthwise movement of laser 24 and printing roller 10 relative to each other. Alternatively, both printing roller 10 and laser 24 can be stationary, and laser 24 can be controlled to scan in the lengthwise direction of printing roller 10. If printing roller 10 is too long for such an operation, a plurality of lasers 24 can be mounted in spaced relation along the lengthwise direction of printing roller 10 for such scanning operation.

In order to control laser 24 to correctly ablate printing plate 18 to form the printing image thereon, a control device 34 is provided, which can be a central processing unit (CPU) or computer which is programmed to control the ablation and relative movement of laser 24 and printing roller 10. Control device 34 controls drive motor 28 and/or drive motor 28' to control relative lengthwise movement of printing roller 10 and laser 24 during the ablation operation, and also controls a separate drive motor 36 to rotate cylindrical roller 12 by small increments. In this manner, the outer surface of printing plate 18 is laser ablated to form the printing image. Alternatively, as discussed above, laser 24 can be stationary and carriage 26, drive motor 28 and drive motor 28' can be eliminated, and in such case, control device 34 would control stationary laser 24 to scan across printing plate 18 in the lengthwise direction thereof.

As discussed above, a problem with such arrangement is that variations exist in the ablatability of different plate materials, whereby one plate material will ablate differently from another plate material, even when the image to be formed by laser 24 is the same, and the laser performance remains consistent. The speed of laser ablating is directly proportional to the available energy of laser 24 and the relief depth of ablating. In order to maximize laser ablating speed, it is desirable to set the laser energy to the correct level needed to ablate a particular relief depth.

Therefore, it is necessary to know how deep to laser ablate the material in printing plate 18. Specifically, it is necessary to provide a calibration for the particular materials in order to set the laser energy during a laser ablating operation.

In accordance with the present invention, ablating laser 24 ablates a series of bands 22 into a sample plate material of a printing plate 18 at different laser energies from 0% to 100% energy. Following the ablation process, the surface of printing plate 18 is rinsed clean to remove any residue resulting from the ablation process.

After the printing plate 18 is rinsed clean, a scanning laser 24' mounted adjacent ablating laser 24, traverses across the ablated plate material and automatically measures the relief depth in each of the ablated bands 22. Alternatively, the same laser 24 used for ablating can produce this scan.

Laser 24' focuses a beam of light 30 that is bounced off the outer surface of printing plate 18, and is received by a detector 32, such as an optical detector, that produces a signal corresponding to the depth of the band 22 being scanned. Alternatively, detector 32 can provide its own source of light against printing plate 18, which is then bounced off the same and received by detector 32. For example, detector 32 can include a conventional photodiode which directs light against printing plate 18, and a photodetector which detects the light reflected back therefrom. Generally, any signal waves in the electromagnetic spectrum can be used for such detection operation, which include, without limitation visible light rays, infrared rays, laser light, etc.

A signal corresponding to this detection operation is then provided by detector 32 to a central processing unit (CPU), which can be formed by control device 34.

An example of data produced by this operation shows a scan of ten different ablated bands 22 to produce the following table of laser ablating energy versus relief depth for each band:

TABLE I

10 Regular steps

| Laser Energy % | Relief Depth mm |
|---|---|
| 0 | 0 |
| 10 | 0.05 |
| 20 | 0.10 |
| 30 | 0.15 |
| 40 | 0.20 |
| 50 | 0.25 |
| 60 | 0.30 |
| 70 | 0.35 |
| 80 | 0.40 |
| 90 | 0.45 |
| 100 | 0.50 |

By correlating the laser input energy and position data from ablating laser 24 versus the relief depth results, a data table and graph of laser energy versus relief depth is automatically generated for the particular material. As shown, a straight line plot is graphed in FIG. 2 corresponding to Table I, so that any depth between the measured points can be interpolated to determine the correct laser energy for the particular material.

The above steps and subsequent graphing are performed for various materials so that the correct laser energy versus relief depth can be determined for any selected one of a plurality of particular materials. It will be appreciated that the higher the laser energy (laser power and duration of laser ablation), the deeper the ablation. The number of steps and the width of the ablated band can be defined and specified.

The ideal relationship between laser energy versus relief depth is a straight line or a smooth curve. In this manner, control device 34 can interpolate the data using logarithms, to remove small variations in the data, and to create a uniform relationship between laser energy and relief depth.

Figure 4:
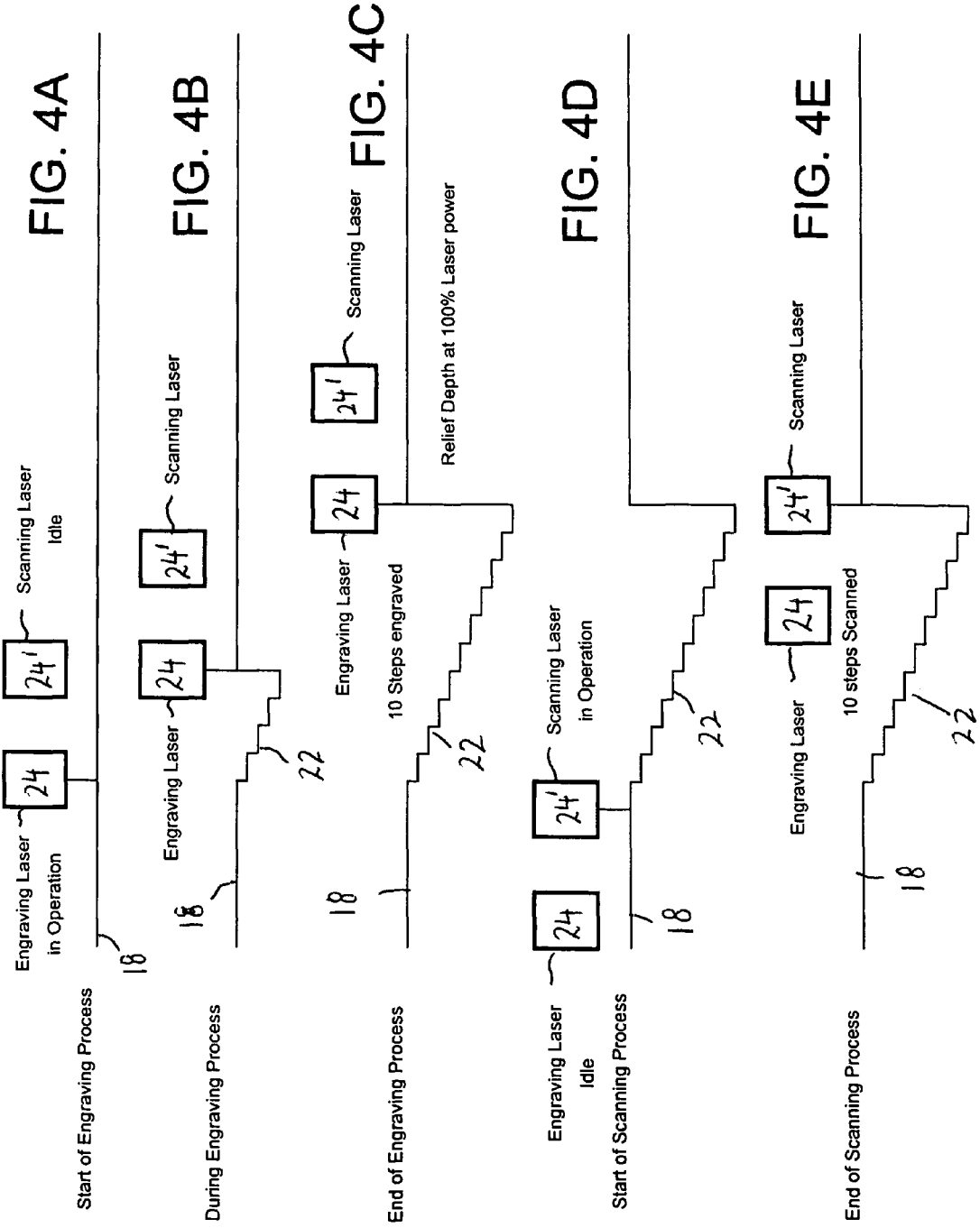
FIGS. 4A-4E are graphical diagrams showing the method according to the present invention.

Example 1 is shown in the flow process drawings of FIGS. 4A-4E. Specifically, FIG. 4A represents the start of the ablation process by which ablating laser 24 ablates the series of bands 22 into the plate material of printing plate 18 at different laser energies from 0% to 100% energy. FIG. 4B shows the ablating step which has ablated four bands 22 at different depths, illustrated by the downwardly extending steps for different energy levels. FIG. 4C shows the ablating step which has ablated all ten bands 22 at different depths, illustrated by the downwardly extending steps for different energy levels. During the steps of FIGS. 4A-4C, as shown therein, scanning laser 24' is idle.

Then, as shown in FIG. 4D, ablating laser 24 is idle, and scanning laser 24' starts the scanning operation of the ten bands 22. FIG. 4E shows the end of the scanning process by scanning laser 24' which has scanned all ten bands to determine the depths thereof in relation the laser ablating energy.

However, the present invention is not limited by the ten step process, as shown by another example of data produced by this operation with a scan of twenty-six different ablated bands 22, in the following table:

TABLE II

26 Irregular steps

| Laser Energy % | Relief Depth mm |
|---|---|
| 0 | 0 |
| 2 | 0.01 |

TABLE II-continued

26 Irregular steps

| Laser Energy % | Relief Depth mm |
|---|---|
| 4 | 0.02 |
| 6 | 0.03 |
| 8 | 0.04 |
| 10 | 0.05 |
| 12 | 0.06 |
| 14 | 0.07 |
| 16 | 0.08 |
| 18 | 0.09 |
| 20 | 0.10 |
| 30 | 0.15 |
| 40 | 0.20 |
| 50 | 0.25 |
| 60 | 0.30 |
| 70 | 0.35 |
| 80 | 0.40 |
| 82 | 0.41 |
| 84 | 0.42 |
| 86 | 0.43 |
| 88 | 0.44 |
| 90 | 0.45 |
| 92 | 0.46 |
| 94 | 0.47 |
| 96 | 0.48 |
| 98 | 0.49 |
| 100 | 0.50 |

Figure 3:
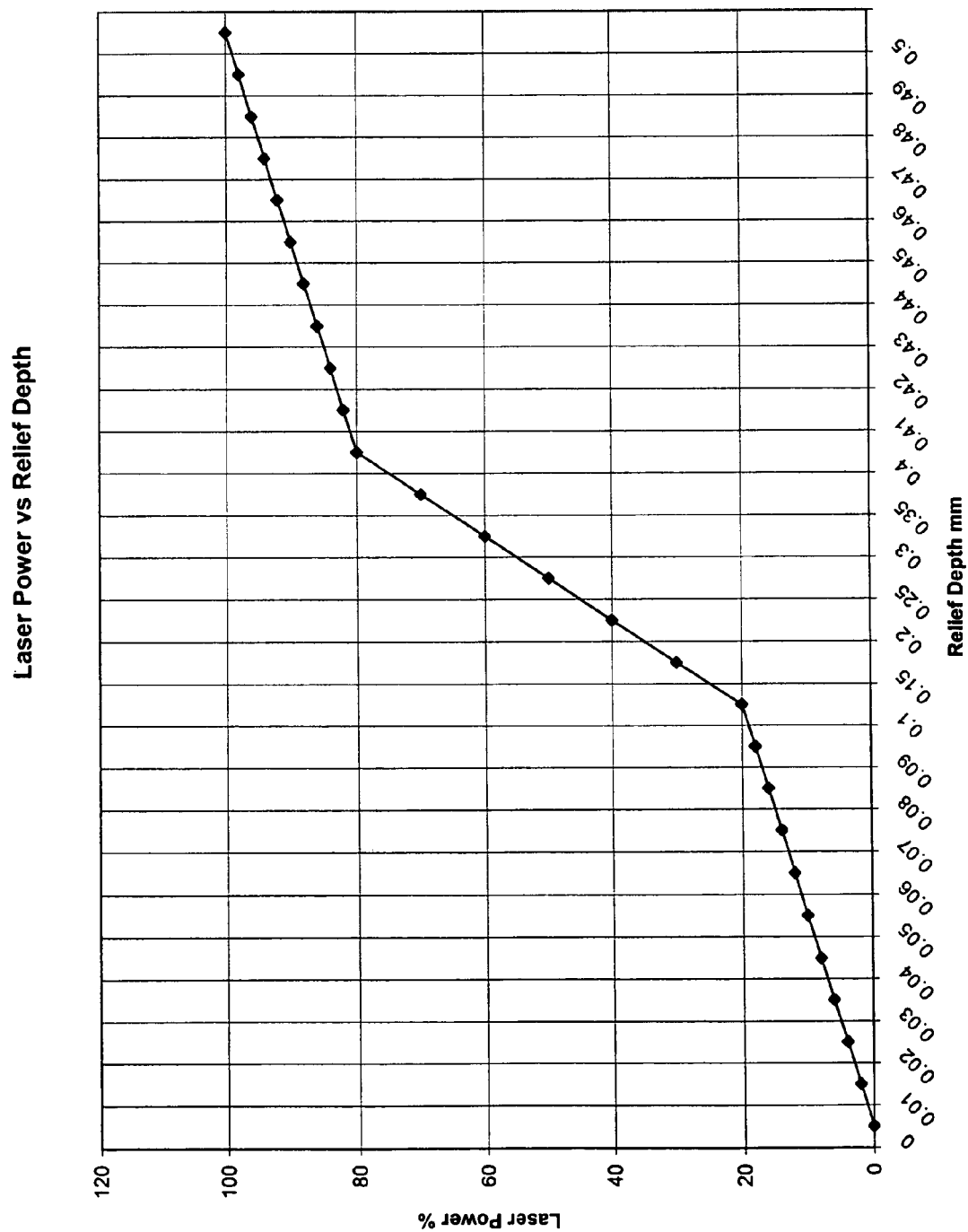
FIG. 3 is graphical diagram of a twenty-six step scan of laser energy versus ablated depth.

As shown, a multi-slope straight line plot is graphed in FIG. 3 corresponding to Table II, so that any depth between the measured points can be interpolated to determine the correct laser energy for the particular material.

Finally, the system saves the material calibration data of Tables I and II to a unique file in a memory, such as a hard drive 38 connected with control device 34, with specific relation to the type of plate material and date of test as a reference identification.

Then, in use, when laser ablating a printing plate 10 to ablate a printing image thereon, the material calibration data for a particular material to be used for the printing plate 10 is first determined. A file stored on hard drive 38 is searched corresponding to this material. Then, a target relief depth for the printing image is selected, whereupon control device 34, using the selected file for the particular material, will automatically control ablating laser 24 to select the optimum laser energy for that material in order to achieve the desired ablating depth. Of course, it will be appreciated that the files may be generated by a manufacturer of the apparatus of FIG. 1 and stored in memory 38 when sold to an end user, and the end user will then use the data stored in memory 38 to automatically control ablating laser 24 to select the optimum laser energy for that material in order to achieve the desired ablating depth. In this regard, the manufacturer would use a first laser 24, and the end user a second laser 24. In like manner, the manufacturer may use a first control device 34, and the end user a second control device 34 associated with a memory 38 having stored therein the previously determined data of laser ablating energy versus relief depth. In this regard, the manufacturer may use the apparatus of FIG. 1 for providing the correlations of laser ablating energy versus relief depth for each of a plurality of materials, while the end user may use identical or similar apparatus to FIG. 1, with the stored data of these correlations therein, for laser ablating a printing image on a printing plate formed by one of the materials.

Figure 5:
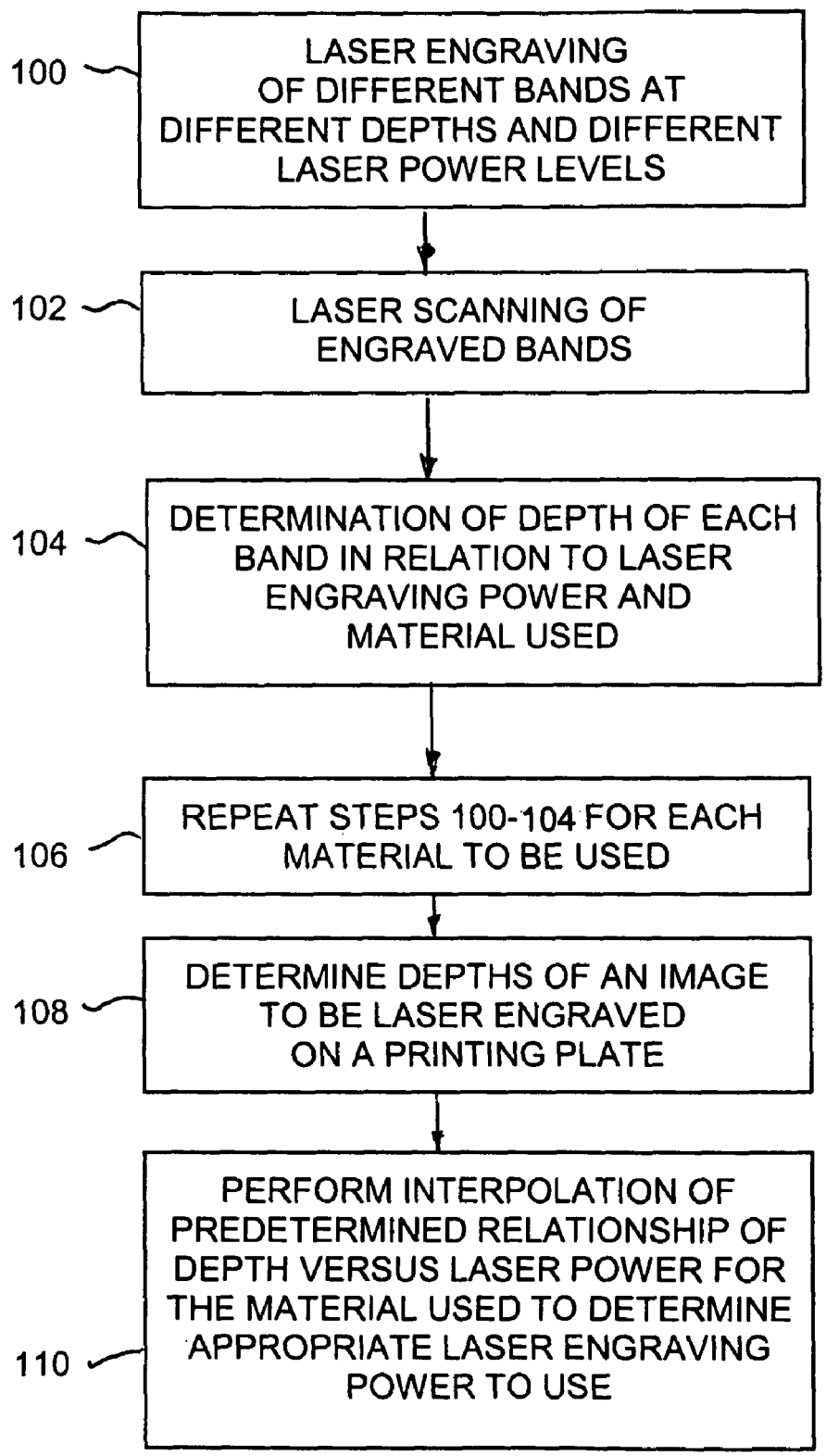
FIG. 5 is a flow chart diagram showing the method according to the present invention.

A flow chart of the above steps is shown in FIG. 5. In step 100, after a material of a printing plate 18 has been selected, laser ablating of different bands 22 at different depths and different laser energy levels occurs by means of ablating laser 24. Then, in step 102, the ablated bands 22 are scanned by scanning laser 24', and control device 34 in step 104, in response to detection by detector 32, determines the depth of each band 22 in relation to the laser ablating energy and material used. This data is stored in memory 38. The graphical diagrams of FIGS. 3 and 4 can be output by control device 34 in response to the data in memory 38, via a keyboard 40 and monitor 42 connected with control device 34.

Steps 100-104 are then repeated for each material to be used as a printing plate 18.

Then, when it is desired to laser ablate an image on a printing plate 18 of one of the selected materials, the desired depths of the image to be laser ablated on the printing plate 18, are determined in step 108. By means of control device 34, keyboard 40 and monitor 42, in step 110, interpolation is performed of the predetermined relationship of depth versus laser energy for the material used, in accordance with the data for that material stored in memory 38, to determine the appropriate laser ablating energy to be used when laser ablating printing plate 18 to produce the image. Control device 34 then adjusts the laser ablating energy for the particular material of the ablateable plate 18 in order to ablate the printing image thereon with the correct depth.

It will therefore be appreciated that the present invention has the following advantages:

1) substantially reduces or eliminates manual measurements during the calibration process, by using previously determined laser scanning versus depth measurements;

2) correlates optimum laser energy in relation to ablated depth;

3) reviews and modifies data to remove insignificant errors;

4) establishes an optimum laser energy level for optimum ablating speed for any plate material; and 5) reduces the time taken to carry out plate material calibrations to minutes rather than hours.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A method for calibration of laser ablating energy versus ablating depth in a non-living material, comprising the steps of:

storing correlated data of detected depths of laser ablated areas of a first sample of a selected non-living material and correlated laser energy levels for each area in a memory to provide calibration of a laser for the selected non-living material;

ablating a desired depth in a different sample of said non-living selected material with a first laser;

interpolating laser ablating energy levels for the desired depth in the different sample of said material in accordance with said stored correlated data corresponding to said first sample in the memory; and controlling the laser to laser ablate the selected material in accordance with the interpolated laser ablating energy levels, wherein said different sample is a material on which an image is to be created for printing.

2. A method according to claim 1, further comprising the steps of:

ablating different depths in the first sample with different laser energy levels for each depth;

detecting each depth with a scanning laser which scans each depth;

correlating the detected depths with the energy levels used to ablate each area to produce the correlated data; and storing the correlated data in said memory.

3. A method according to claim 2, wherein said step of detecting includes the step of detecting reflection of laser light of the scanning laser from each area.

4. A method according to claim 1, wherein:

the step of storing includes the step of storing correlated data of detected depths of laser ablated areas for each of a plurality of non-living materials and laser energy levels for each area;

the step of ablating includes the step of ablating a desired depth in a selected one of the plurality of materials;

the step of interpolating includes the step of interpolating laser ablating energy levels for the desired depth in the selected one of the plurality of materials in accordance with the stored data corresponding to the selected one of the plurality of materials; and the step of controlling includes the step of controlling the laser to laser ablate the selected material in accordance with the interpolated laser ablating energy levels for that material.

5. A method for calibration of laser ablating energy versus ablating depth in a material, comprising the steps of:

ablating different depths in a selected non-living material with different laser energy levels for each depth;

detecting each depth with a scanning laser which scans each depth;

correlating the detected depths with the energy levels used to ablate each area to produce correlated data to provide calibration of a laser for the selected non-living material; and storing the correlated data in a memory, wherein said material is a material of a type on which an image is to be created for printing.

6. A method according to claim 5, wherein said detector includes a device which detects reflection of laser light of the scanning laser from each area.

* * * * *